United States Patent [19]

Bazlen et al.

[11] Patent Number: 4,481,575

[45] Date of Patent: Nov. 6, 1984

[54] ARRANGEMENT IN A DATA PROCESSING SYSTEM TO REDUCE THE CYCLE TIME

[75] Inventors: Diëter Bazlen, Stuttgart; Johann Hajdu; Günter Knauft, both of Boeblingen, all of Fed. Rep. of Germany

[73] Assignee: International Business Machines Corporation, Armonk, N.Y.

[21] Appl. No.: 352,663

[22] Filed: Feb. 26, 1982

[30] Foreign Application Priority Data

Mar. 23, 1981 [EP] European Pat. Off. ........ 81102152.6

[51] Int. Cl.³ .............................................. G06F 1/04
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,110,822 | 8/1978 | Porter et al. ...................... | 364/200 |
| 4,187,539 | 2/1980 | Eaton ................................ | 364/200 |
| 4,270,181 | 5/1981 | Tanakura et al. ................. | 364/200 |
| 4,305,124 | 12/1981 | Marro et al. ....................... | 364/200 |

OTHER PUBLICATIONS

"Effective Pipelining of Digital Systems", J. R. Jump et al., IEEE Transactions on Computers, vol. C-27, No. 9, pp. 855-865, Sep. 1978.
"Maximal Rate Pipelined Solutions to Recurrence Problems", P. M. Kogge, Proceedings of Annual Symposium on Computer Architecture, 9th-11th Dec. 1973, IEEE 1973, pp. 71-76.

Primary Examiner—Raulfe B. Zache
Assistant Examiner—Mark P. Watson
Attorney, Agent, or Firm—Robert J. Haase

[57] ABSTRACT

The cycle time of a data processing system should always be determined in such a manner that data from a source register, after having been propagated through, if necessary, several transfer sections and line drivers, and through a chain of logic circuits for the respective processing steps, can be stored in the result or sink register safely and even with the worst case propagation tolerance of all elements involved. The ideal cycle time therefore, which is dependent on the processing speed of the slowest chain of logic circuits, has to have added time segments for the worst case of unprecise clocking.

A reduction of the cycle time by the above mentioned added time segments, and if necessary by the propagation delays in the transfer sections and in the line drivers, is achieved when the chain of logic circuits and thus its delay time is divided into two partial chains with the partial delays and if the sink register is arranged between the two partial chains. By thus splitting the chain of logic circuits into two partial chains, the logic partial functions can be executed during that time segment which is composed of the above mentioned added time segments.

4 Claims, 8 Drawing Figures

ARRANGEMENT IN A DATA PROCESSING SYSTEM TO REDUCE THE CYCLE TIME

TECHNICAL FIELD

The invention relates to an arrangement in a data processing system to reduce the cycle time, in accordance with the preamble of claim 1.

In electronic data processing systems, the operational steps, i.e. processing and transfer steps, are generally controlled by a clock. Such a clock substantially consists of an oscillator generating a continuous meander-like pulse sequence, and of a clock-controlled unit which strobes, shapes, and amplifies pulses of the meander-like signal. The amplification of the clock pulses should be high enough to suffice for supplying clock signals to the entire data processing system.

In such a structure, the clock pulses have to pass through a number of switching stages, from the oscillator to the user. In the present instance, the term "user" refers e.g. to the storage elements (latches) of which data origin or source registers as well as result or sink registers are composed.

Under realistic conditions, the switching stages have delay tolerances, so that a clock pulse arrives at a storage element of one of the above mentioned registers sooner, or in another case later than ideally, i.e. in cases without delays.

However, the cycle time should always be fixed in such a manner that data from the data origin register, after having been propagated through a chain of logic circuits, can be stored in the result or sink register safely, even with a worst case delay tolerance of all elements involved. So the ideal cycle time which is dependent on the processing speed of the chain of logic circuits is always to have added time segments which take into consideration the worst case of unprecise clocking. Unprecise clocking thus always causes an extension of the ideal cycle time.

As already indicated, the cycle time is determined by that chain of the successive logic circuits which is used in each, or almost in each cycle, and which has the longest propagation time. In larger data processing systems which are more demanding with regard to the processing speed, this chain is e.g. the arithmetic and logic unit (ALU) 5 shown in FIG. 1. This arrangement represents the known and now generally used type of clock-controlled data processing. The arithmetic and logic chain between a data origin or source register (A-REG) 4 and a result or sink register (B-REG) 6. The output of this sink register is connected with all user components of the data processing system, i.e. also via an arrangement of gates 3, to the origin register 4 used by the arithmetic and logic unit 5 as an input register. In this manner, the result data of the arithmetic and logic unit can also be used as source data in the immediately following cycle.

Figure 2:
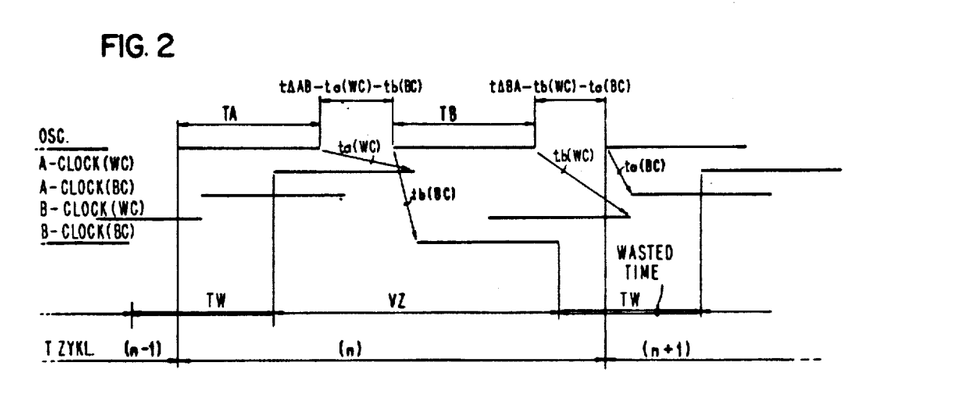
FIG. 2 a time diagram representing the pulse sequences in the known data processing structure according to FIG. 1, FIG. 3 a detailed block diagram of the known data processing structure of FIG. 1, FIG. 4 a time diagram of the pulse sequences in the known data processing structure according to FIG. 3, FIG. 5 a block diagram of a data processing structure according to the invention, FIG. 6 a time diagram showing the time sequences in the data processing structure according to FIG. 5, FIG. 7 a more detailed block diagram of a data processing structure according to the invention as represented by FIG. 5, and FIG. 8 a time diagram of the pulse sequences in the data processing structure according to the invention as shown by FIG. 7.

According to the clock signal sequence of known clocking controls shown in FIG. 2, a clock cycle $T_{ZYKL}$ is composed of the time segment TA (i.e. the oscillator pulse width generating the pulses of the A-clock), of the time segment $t\Delta AB$, and of the time segment TB (oscillator pulse width generating the pulses of the B-clock), and finally of the time segment $t\Delta BA$.

As shown in FIG. 2, time segment $t\Delta AB$ represents the width of the gap between a pulse of the oscillator A-clock and the following pulse of the oscillator B-clock, and is composed of the time segment ta(WC) minus the time segment tb (BC). There, BC is the best case position, and WC the worst case position of a time reference, e.g. of a leading edge or of a trailing edge of a clock pulse. So ta(BC) defines the smallest possible time displacement of a pulse of the A-clock, with reference to a pulse of the oscillator A-clock, ta(WC) represents the largest possible time displacement of the above mentioned clock pulse, tb(BC) represents the smallest possible displacement of a pulse of the B-clock, with reference to a pulse of the oscillator B-clock, and tb(WC) represents the largest possible displacement of this clock pulse.

In order to avoid critical time conditions in the data transfer or data processing within a cycle, pulse widths TA and TB should be at least great enough to ensure a safe setting of the storage elements which compose the source and result registers. This applies when the above mentioned pulse widths are greater than, or at most equal to the greatest delay (WC) of the storage elements of both registers 4 and 6. Besides, time segments $t\Delta AB$ and $t\Delta BA$ have to be such that there never appear clock pulses simultaneously at source register 4 and sink register 6 (no overlapping with respect to time).

If these minimum conditions are satisfied, time segments TA, TB are extended such that the distance between the worst case position of the leading edge of a pulse of the A-clock, and the best case position of the trailing edge of a pulse of the B-clock corresponds to the delay VZ of the longest chain of logic circuits. For the ideal conditions, i.e. without considering further delays of propagation time, as observed in a real arrangement e.g. in accordance with FIGS. 3 or 4, this relation can be expressed in the following equation:

$$T_{ZYKL} = VZ(WC) + (ta(WC) - tb(BC)) + (tb(WC) - ta(BC)) \quad (1)$$

The term $(ta(WC) - tb(BC) + (tb(WC) - ta(BC))$ corresponds to the time segment marked TW in FIG. 2. With respect to the actual data processing, this time segment is wasted time, since during this period TW no logic or transfer functions can be carried out. Time TW is thus precisely the amount by which an ideal cycle time $T_{ZYKL}$ (ideal) has to be extended owing to delay tolerances of the A and B-clock to make sure that the data can be buffered untruncated in sink register 6.

Figure 3:
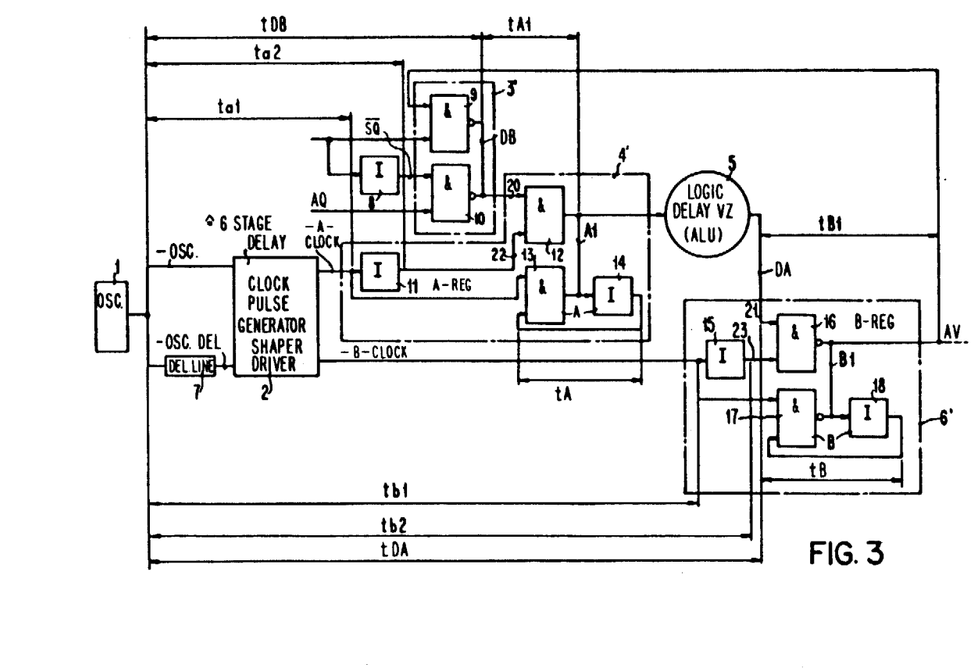
Figure 4:
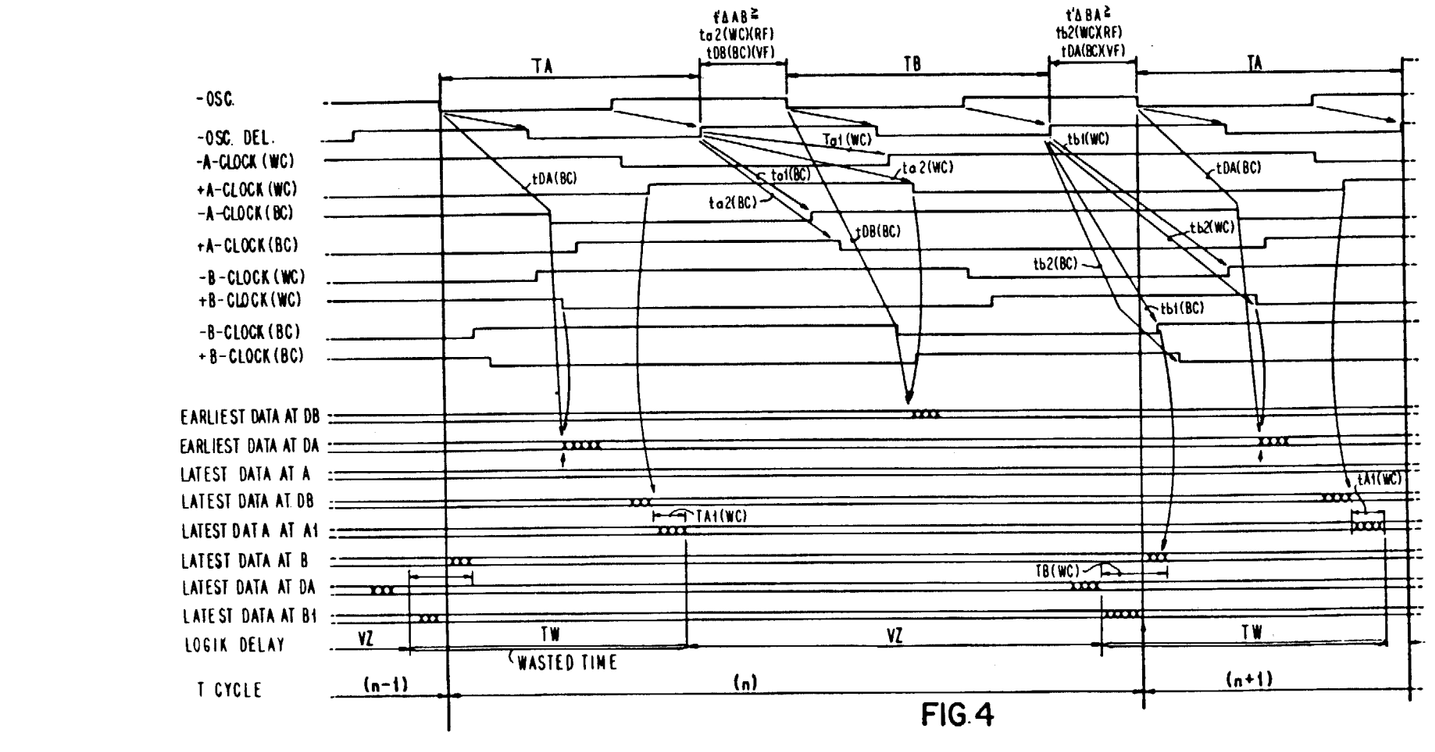

FIGS. 3 and 4 represent real conditions taking into consideration also the register delays of the known clocking control. These FIGS. are furthermore based on the following realistic assumptions:

For clock generation, shaping and driver approximately 6 stage delays, and for delay VZ of the logic circuit (e.g. ALU) approximately 14 stage delays.

The delay tolerances are assessed with ±25% per logic stage.

As shown in FIG. 3, the output signals of oscillator (OSC) 1 are directly applied to a first input of clock generator 2 and, via delay line 7, to a second input of generator 2. Generator 2 performs pulse shaping and in its driver part the amplification of the clock signals. Out of these signals, clock generator 2 produces the pulses of the A and B-clocks, i.e. the pulses with the negative polarity indicated by the minus sign are transferred to the connected circuits.

Figure 1:
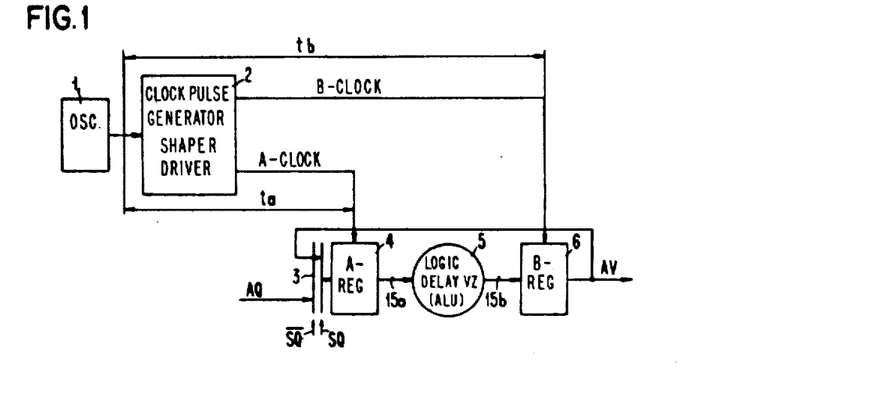
FIG. 1 a block diagram of a known data processing structure.
Figure 7:
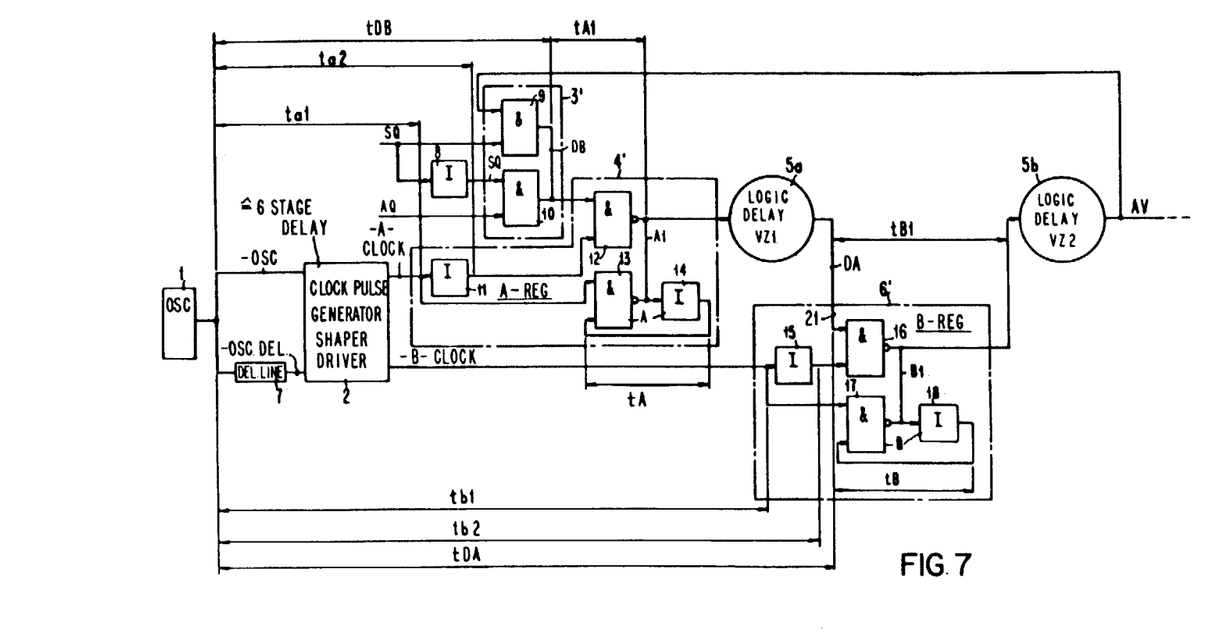

Gate 3 in FIG. 1 which is controlled by the selection signals SQ and $\overline{SQ}$, and which controls the data distribution at the input of the A-register 4 in that it transports either the output data of B-register 6 or data from other sources AQ, reappears in FIG. 3 as gate 3' provided for each bit of the A-register. Please note in this connection that for A-register 4 as well as for B-register 6 only one stage 4' or 6' is represented in FIG. 7 for the storing of one respective bit. For broader A and B-registers a number of additional stages 4' and 6' which corresponds to the width of this register has to be added in parallel.

Stages 4' and 6' composing the A-register and B-register, are by nature latch stages of the structure shown in FIG. 3. They consist of two respective inverter circuits 11 and 14, as well as of two AND/INVERTER circuits 12 and 13 in the case of register stage 4', and of the two inverter circuits 15 and 18, and the two AND-/INVERTER circuits 16 and 17 in case of register stage 6'. The register stages of the A-register are controlled by the A-clock pulses of the A-clock, and the stages of the B-register are controlled by the B-clock pulses of the B-clock.

The individual stages have a data input 20 or 21, respectively via which they can store the data bit applied for the duration of one clock period. However, the register stage can receive and store, during the duration of the clock signal applied at its clock input 22 or 23, a new data signal via input 20 or 21. FIGS. 1 and 3 also show that the stages of the A-register are controlled by the A-clock, and the stages of the B-register by the pulses of the B-clock. The data processed in logic chain 5 should therefore be available at input 21 of the respective stage of B-register 6' early enough to be received and stored with the following pulse of the B-clock.

FIG. 4 shows the time ratios of the clock and data signals for the periods given in FIG. 3. The importance of the time segments of FIG. 4 is substantially represented in FIG. 3. The designations used in FIG. 4 for the time segments differ from those in FIG. 3 in that the former are supplemented by indications as BC and WC differentiating between the best case and worst case propagation delay.

As a consequence of the statements made above, the cycle 5 time or cycle length for a real case is as follows:

$$T_{ZYKL} = VZ(WC) + ta2(WC)(VF) - tb1(BC)(RF)) + \\ (tb2(WC)(RF) - tDA(BC)(VF)) \\ + tA1(WC)(VF) + tB(WC)(VF) \quad (2)$$

In equation (2), tA1 and tB are provided for the switching delays in the latches. Furthermore, it should be pointed out that the clock itself has to consider a range of logic delay VZ which extends from VZ=0 to VZ=VZ(WC).

So cycle time $T_{ZYKL}$ is determined by delay VZ of the (longest) chain of logic circuits through which a data signal has to be propagated within one cycle, with the addition of further delay tolerances subjected to a predetermined band width of delay tolerances. Furthermore, there is a propagation delay ta2 for the leading edge of a pulse of the A-clock, seen with respect to its worst case time, furthermore propagation delay tA1, the so-called data propagation time through a storage element of the source register, with the leading edge of the pulse of this data signal having to be considered at its worst cast time. There is also propagation delay tB of the worst case, i.e. the maximum propagation required by a data signal to travel from the input of the storage element to the output, and back again to the input, to be reliably latched. There is also the difference of propagation delays tb2, worst case of the trailing edge, and tDA, best case of the leading edge. As shown in FIGS. 3 and 4, tDA is the propagation delay of a path, beginning from the oscillator via the clock generator (for A-clock), through AND circuit 13, and through the logic circuit to input 21 of AND gate 16. The cycle time is then reduced by the amount of tb1 of the best case time position of the leading edge. Time segment tb1 corresponds to the propagation delay of a pulse of the oscillator B-clock at the output of oscillator 1 to the input of the storage element in the sink register.

As shown by a comparison if FIGS. 2 and 4, values tΔAB and tΔBA of the ideal arrangement according to FIG. 1 differ from the values t'ΔAB and t'ΔBA of the real circuit according to FIG. 3. The given values respectively represent the necessary gaps between the trailing edge of a pulse of the oscillator A-clock, and the leading edge of a pulse of the oscillator B-clock, or between the trailing edge of a pulse of the oscillator B-clock and the leading edge of a pulse of the oscillator A-clock. In the actual case, these gaps have widened so that the wasted time TW resulting from the sum of the values of those gaps is longer, too.

As pointed out above, this wasted time section TW is that which increases the ideal cycle time by its own amount. Consequently, the basic clock of electronic data processing systems is also longer per cycle by this amount, so that the real processing speed of electronic data processing systems is lower accordingly.

This disadvantage has been known since quite some time. Attempts have been made to overcome it by specific adjustable delay and pulse shaping circuits which reduce the delay tolerances of the clock pulses but which owing to temperature and load variations could never entirely eliminate them. This procedure is problematic particularly in connection with electronic data processing systems structured in accordance with the rules of large scale integration technique (LSI), since particularly in that case there is always a lack of connecting points of the semiconductor chips to the exterior, so that for clock pulse adjustments such connecting points are frequently not available. Therefore essential elements of the clock pulse supply, as e.g. the clock amplifiers and pulse shapers have been provided on the semiconductor chips themselves so that the latter are no longer accessible for an adjustment.

Consequently, the disadvantage of the known solutions is that if adjustable delay and shaper circuits are used they are rather complex and expensive, and in case of maximum integration technique no longer adjustable at all.

SUMMARY OF THE INVENTION

It is therefore an object of the present invention to provide a solution according to which the cycle time and consequently the basic clocking of electronic data processing systems can be selected in such a manner that it corresponds to the ideal case where the propagation delay tolerances are not considered.

Although full elimination of the delay tolerance effects is still somewhat restricted it is possible in all reasonable design concepts of electronic data processing systems, with the exception of array structures.

This object of the invention is achieved by the features of the main claim. Advantageous embodiments and further developments of the subject of the invention are given in the subclaims.

Figure 5:
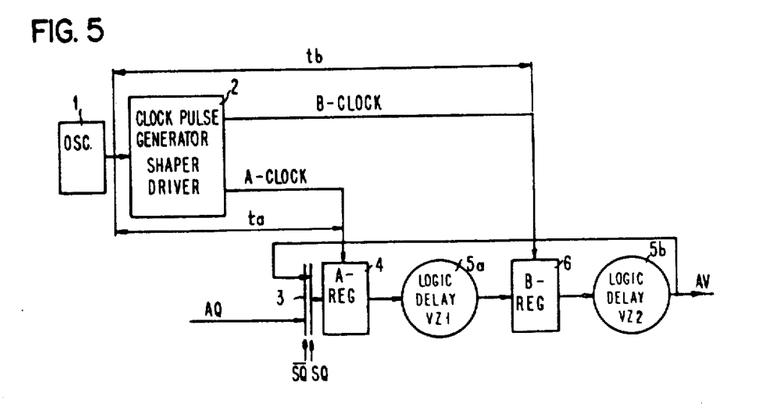

The main difference between the prior art discussed in detail in the above introduction and the new data processing structure consists in that data processing functions, as e.g. logic functions or transfer functions, can be executed during time segment TW already. This is possible because the new solution has generally departed from the concept of an undivided "atomic" chain of concatenated logic circuits which has been used for many years, and has adopted a chain of logic circuits cut into two parts. There, the overall delay VZ of e.g. an arithmetic and logic unit (ALU) 5, as shown in FIGS. 1 and 3 is split into two partial ALUs 5a and 5b with the partial delays VZ1 and VZ2 (as shown in FIG. 5). Consequently there applies:

$$VZ = VZ1 + VZ2 \qquad (3)$$

By thus splitting the logic circuit chain into two parts it is possible to execute during time segment TW one part of the logic function with part VZ2 of the delay. The function of B-register 6 is now that of an intermediate result register rather than that of a sink register at the end of the logic delay, as in the known arrangement of FIGS. 1 and 3.

BRIEF DESCRIPTION OF THE DRAWING

In the following, two embodiments of the invention will be discussed with reference to the drawings. While FIGS. 1 to 4 represent the problem to be solved by the invention, and thus the object of the invention, FIGS. 5 to 8 depict the above mentioned two embodiments of the invention.

The FIGS. show the following:

DETAILED DESCRIPTION

The advantage of the invention is that in all practically useful cases of the design concept of electronic data processing systems the effects of propagation delay tolerances in the designing of the shortest cycle times for the data processing are completely eliminated in a very simple, inexpensive, and reliable manner. This leads to an assessable cycle time reduction, and thus to a speed increase of up to 44% in the assumed number of circuits in the clock path and the assumed tolerance ratios of the real example selected.

The speed increase can even be 100% when the overall delay of one clock path corresponds to delay VZ(WC). The overall delay of a clock path is e.g. composed of the delays along the transfer lines 15a, 15b, in line drivers, in logic arrays and logic circuits as e.g. the ALU, the clock path extending from the output of A-register 4 in FIG. 1 to the input of B-register 6.

Figure 6:
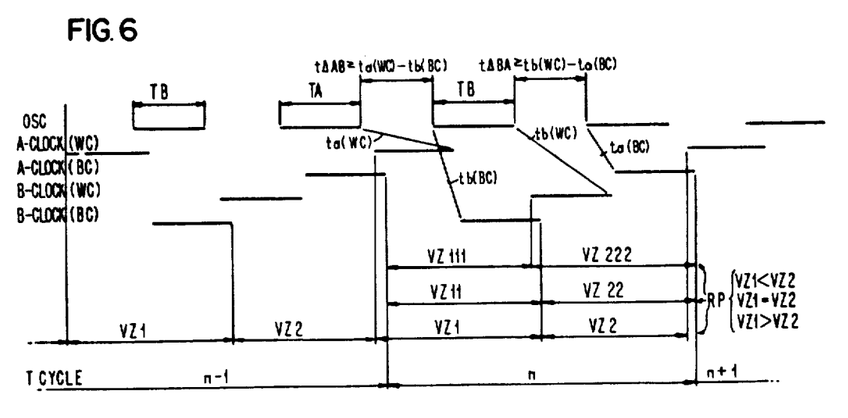

The division ratio of the atomic chain of logic circuits can be varied, as shown in the areas VZ1, VZ11, VZ111, and VZ2, VZ22, VZ222 of FIG. 6, according to reference point RP. There consequently applies the following less complicated equation for the cycle time:

$$T_{ZYKL} = VZ1(WC) + VZ2(WC) \qquad (4)$$

As shown in equation (4), the cycle time is now independent of clock-delay tolerances, but only under the condition that the overall delay VZ of the logic arrangement is equal to, or higher than the sum of pulse widths and gaps which however are subject to the above mentioned minimum conditions:

$$VZ1(WC) + VZ2(WC) \geq TAmin + TBmin + t\Delta AB + t\Delta BA \qquad (5)$$

The following is to be applied for:
TAmin = ta(WC) − ta(BC) and
TBmin = tb(WC) − tb(BC)

As mentioned in connection with equation (1), equation (4) is not quite correct since it has again been assumed that the registers composed of latches are ideal registers, i.e. not subject to delays.

Figure 8:
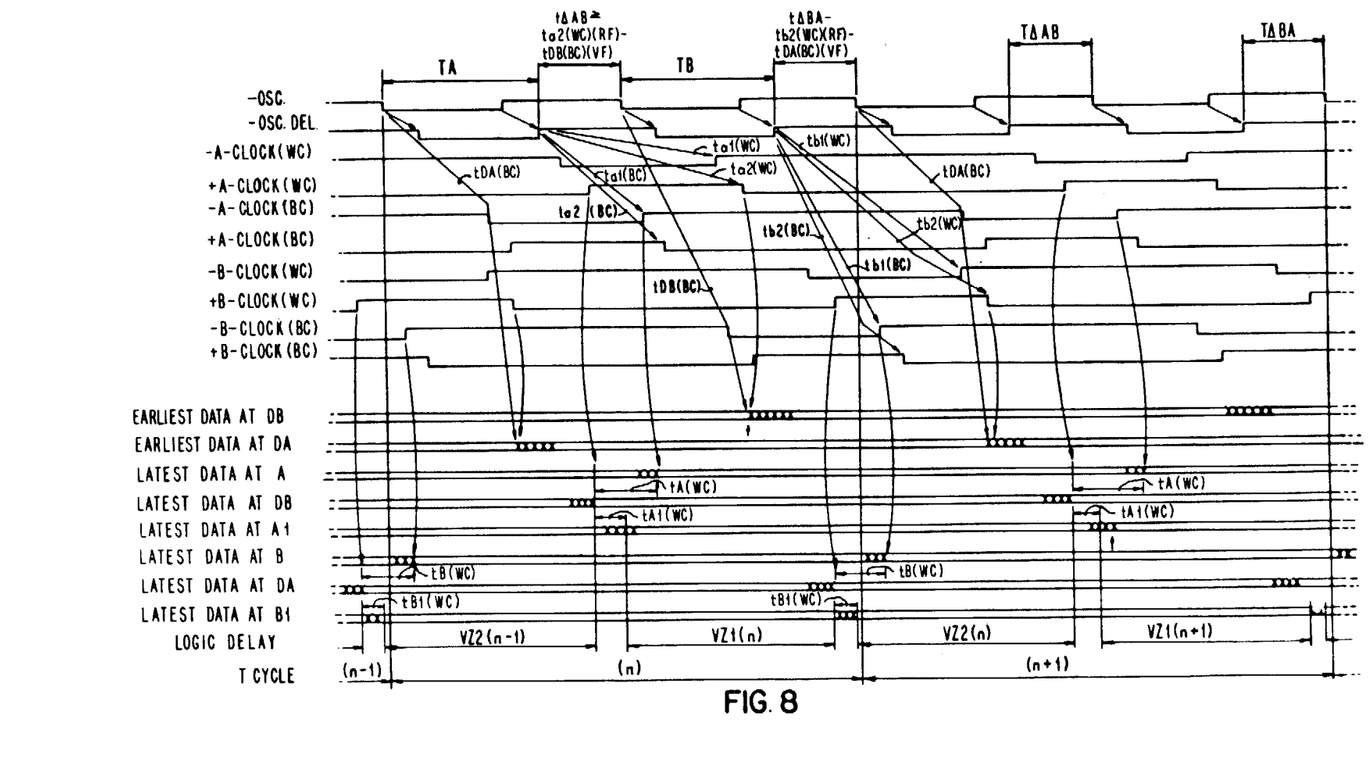

The real conditions which now consider the register delays, too, are represented in FIGS. 7 and 8. These already include the practical considerations made in connection with FIGS. 4 and 5. The overall delay of the atomic chain of logic circuits has merely been divided in a ratio of 1:1, so that approximately 7 stage delays apply both to partial delay VZ1 and to partial delay VZ2. As above, the delay tolerance has been considered with ±25% per logic stage.

Under these conditions, the precise expression of equation (4) is as follows:

$$T_{ZYKL} = VZ1 + VZ2 + tA1(WC) + tB1(WC) \qquad (6)$$

As shown by the detailed block diagram of the data processing structure in FIG. 7, time segments tA1(WC) and tB1(WC) are those which have been designed for the delay in the latches of register stages 4' and 6' of which the A-register and the B-register are composed, i.e. which have to be assumed for a real circuit arrangement. For the time segments of FIGS. 7 and 8 there apply the same designations and meanings as in connection with FIGS. 3 and 4. They are also the same time segments which are of importance in the above equation 2 and 6 for cycle time $T_{ZYKL}$. It is evident e.g. particularly from FIGS. 4 and 8 that for the duration of one cycle the earliest and also the latest occurrences of the data at locations A, A1, B, B1, DA and DB of the data processing structure are of considerable importance, owing to the tolerances of the pulse spacings of the various clock sequences, i.e. −A-clock, +A-clock, −B-clock and +B-clock, taking into consideration the assumed delay tolerances in the various sections of the data processing arrangements according to FIGS. 3 and 7.

Equation (6) does not apply, either, to arbitrarily small delay values of the logic circuit, i.e. for arbitrarily small VZ1 and VZ2. In fact, minimum conditions have to be followed, too, which in the case of equation (6) are as follows:

$$VZ1 + VZ2 + tA1(WC) + B1(WC) \geq TAmin + T\text{-}Bmin + t\Delta AB + t\Delta BA \qquad (7)$$

For the minimum pulse width of the oscillator signal (see FIG. 8) there applies the following:

TAmin = (ta2(WC)(VF) − ta1(BC)(RF)) + tA(WC)

and

TBmin = (tb2(WC)(VF) − tb1(BC)(RF)) + tB(WC).

As shown by FIG. 7, time segments tA(WC) and tB(WC) are the minimum periods that have to be made available for reliably setting a latch of the A-register or B-register, respectively.

As demonstrated by a comparison of FIGS. 4 and 8, the above real conditions reveal the fact that cycle time $T_{ZYKL}$ of a known arrangement represented in FIG. 3 is longer by 44% than the cycle time of the new arrangement of FIG. 7.

We claim:

1. Arrangement in a data processing system to reduce the cycle time, the cycle time being established such that data emitted from a data source, enabled by a clock pulse from an A-clock pulse source, can be safely stored in a receiver circuit, which is enabled by a clock pulse from a B-clock pulse source, wherein the data are propagated through a chain of data flow elements characterized in that the effects of propagation delay tolerance of all clock control and data flow elements are eliminated in determining the cycle time, the data source being controlled by the clock pulses of the A-clock pulse source, and the receiver circuit by the clock pulses of the B-clock pulse source, and the clock pulses of the two clock pulse sources having the same frequency and not overlapping with respect to time, said chain of data flow elements with a given propagation delay being divided into two partial chains with corresponding propagation delays in such a manner that the first partial chain is provided between said data source and said receiver circuit, and the second partial chain between said receiver circuit and said data source.

2. Arrangement as claimed in claim 1, characterized in that the chain of logic circuits is divided into partial chains in such a manner that the partial delay of said first partial chain is greater than the partial delay of said second partial chain.

3. Arrangement as claimed in claim 1, characterized in that the chain of logic circuits is divided into partial chains in such a manner that the partial delay of said first partial chain equals the partial delay of said second partial chain.

4. Arrangement as claimed in claim 1, characterized in that, the chain of logic circuits is divided into partial chains in such a manner that the partial delay of said first partial chain is smaller than the partial delay of said second partial chain.

* * * * *